United States Patent Office 3,509,188
Patented Apr. 28, 1970

3,509,188
LITHIATION OF FERROCENES
Adel F. Halasa, Akron, and David P. Tate, Northfield, Ohio, assignors to The Firestone Tire & Rubber Company, Akron, Ohio, a corporation of Ohio
No Drawing. Filed Aug. 28, 1967, Ser. No. 663,512
Int. Cl. C07f 15/02
U.S. Cl. 260—439                          2 Claims

ABSTRACT OF THE DISCLOSURE

Ferrocene or a derivative thereof is lithiated by reaction, at temperatures in the range 25°–100° C, in a hydrocarbon solvent, with a hydrocarbon lithium, preferably in conjunction with an N,N,N',N'-tetraalkyl ethylene diamine (I). The products are multilithiated ferrocenes predominantly containing 2–5 lithium atoms per molecule, with substantial amounts of products containing 6 and 7 lithium atoms. The products produced in conjunction with (I) tend to higher degrees of lithiation than those produced in the absence of (I), and react with chlorotrimethyl silane to form crystalline and/or liquid nonpolymeric products.

BACKGROUND OF THE INVENTION

This invention relates to the lithiation of ferrocene and derivatives thereof to produce predominantly highly lithiated products containing 2–5 or more lithium atoms per molecule, and to certain trialkyl silyl derivatives of such products.

Butyl lithium has heretofore been reacted with ferrocene to yield predominantly mono- and di-lithiated ferrocenes. It has been found, by one of the present applicants (Halasa) in conjunction with others that this class of compounds is very useful for catalyzing the polymerization of diolefins. It would accordingly be highly desirable to increase the efficiency of preparation of the lithiated ferrocenes, and in particular, to increase the proportion of the more highly lithiated ferrocenes obtained in such preparations.

DESCRIPTION OF THE INVENTION

Synopsis of the invention

According to the present invention, ferrocene, or a hydrocarbon-substituted ferrocene, is reacted in a hydrocarbon medium with a hydrocarbon lithium at relatively elevated temperatures on the order of 25°–120° C., preferably 60°–100° C. The products include lithiated ferrocenes containing predominantly 2–5 lithium atoms per molecule, together with significant amounts of ferrocenes containing 6 and 7 atoms of lithium. Preferably, the reaction mixture contains an N,N,N',N'-tetraalkyl ethylene diamine, which both increases the overall efficiency of the reaction, and enhances the proportion of the products of relatively high degree of lithiation. Also, in those cases where the N,N,N',N'-tetraalkyl ethylene diamine is used, the lithiated products may be treated with halo-trialkyl silanes to yield silylated products which are liquid and/or crystalline, in contrast with the intractable polymeric products produced from multilithiated ferrocenes produced in the absence of N,N,N',N'-tetraalkyl ethylene diamines.

The ferrocenes

The ferrocene component employed in this invention may be ferrocene itself or a hydrocarbon-substituted ferrocene in which the cyclopentadiene rings contain up to 3 hydrocarbon groups replacing hydrogens on the rings, each hydrocarbon group containing up to 10 carbon atoms. Suitable ferrocene-type compounds for the reaction include for instance ferrocene itself, and hydrocarbon-substituted ferrocenes such as methyl ferrocene, ethyl ferrocene, octyl ferrocene, bridged ferrocenes such as the indene-ring homolog of ferrocene, viz, benzoferrocene, methyl ethyl ferrocene, phenyl ferrocene, benzyl ferrocene and the like. It is understood that, instead of pure ferrocenes, there may be employed mixtures in any proportion of compounds above indicated as being suitable.

The lithium hydrocarbons

Suitable hydrocarbon lithium compounds include, for instance, any hydrocarbons containing up to 40 carbon atoms in which one or more hydrogen atoms have been replaced by lithium atoms such as ethyl lithium, butyl lithium, dodecyl lithium, tetramethylene dilithium, pentamethylene dilithium, phenyl lithium, benzyl lithium, and the like. Again it will be understood that mixtures in any proportion of any of the compounds indicated as being suitable may be employed

The N,N,N',N'-tetrahydrocarbon ethylene diamine

The tetrahydrocarbon ethylene diamines used as preferred components in the practice of this invention may be any ethylene diamine (i.e., 1,2-diaminoethane) in which the hydrogen atoms on the amino groups have all be replaced by hydrocarbon groups each containing 1–10 carbon atoms. Suitable hydrocarbon groups will be seen to include alkyl groups such as methyl, ethyl, propyl, butyl, isobutyl, n-hexyl, cyclohexyl, 2-ethyl hexyl, n-decyl and the like, or aryl groups such as phenyl, the various tolyl and xylyl groups, naphthyl, and the like Preferably, the hydrocarbon groups are lower alkyl groups containing up to 3 carbon atoms. Specific exemplary compounds include N,N,N',N'-tetramethyl ethylene diamine, N,N,N',N'-tetraethyl ethylene diamine, N,N-dimethyl-N',N'-diethyl ethylene diamine, N,N,N',N'-tetrapropyl ethylene diamine, N-phenyl-N-methyl-N,N'-diethyl ethylene diamine, N,N,N',N'-tetraphenyl ethylene diamine, N-decyl-N-octyl-N,N'-diethyl ethylene diamine and the like. It will be understood that mixtures of these compounds may be used, rather than the pure compounds.

The conduct of the reaction

In the practice of the invention, the ferrocene and hydrocarbon lithium are mixed together in a hydrocarbon solvent, at ambient temperature and then the temperature adjusted to a relatively high value, on the order of 25°–120° C., and preferably 60°–100° C. The solvent is employed in amounts varying upwardly of approximately equal proportions by weight of solvent and reactants, and most commonly on the order of 8–40 parts by weight of solvent per part by weight of reactants. The hydrocarbon solvent may be any liquid inert hydrocarbon containing from 4 to 40 carbon atoms, or preferably from 5 to 16 carbon atoms per molecule, such as paraffins on the order of propane, butane, hexane, cyclohexane, methyl cylcohexane, heptane, petroleum ether, kerosene, diesel oil, or the like, or aromatic hydrocarbons such as benzene, toluene, the several xylenes, hydrogenated aromatics such as tetralin, Decalin, and the like. The lithium hydrocarbons should be employed in substantial molar excess over the ferrocene or ferrocene derivative, preferably in the ratio in excess of 3:1 lithium hydrocarbon ferrocene. Commonly, this ratio will range from 4:1 to 25:1. Reaction sets in promptly, with replacement of the hydrogen atoms on the cyclopentadienyl rings of the ferrocene and liberation of hydrocarbons corresponding to the hydrocarbon radicals in the lithium hydrocarbon. The reaction may be prosecuted to whatever extent desired, and will usually be complete in 24–96 hours, as indicated by the substantial absence of alkalinity in the solvent phase. The lithiated ferrocenes are precipitated as reddish-brown, readily separable solids, and may be recovered by decantation, filtration, centrifugation or other suitable techniques. As noted above, it is by far preferable to include, in the reaction charge, an N,N,N',N'-tetrahydrocarbon ethylene diamine. The inclusion of this reagent both increases the velocity and quantitative yield of the reaction, and also shifts the distribution of lithium in the products so that greater proportions of the more highly lithiated ferrocenes (say those containing 3–6 and even 7 lithium atoms) are obtained as compared to reactions conducted in the absence of the N,N,N',N'-tetrahydrocarbon ethylene diamines. The tetrahydrocarbon ethylene diamines should be employed in ratios of tetrahydrocarbon ethylene diamine:hydrocarbon lithium varying from 1:3 to 10:1, and preferably at about equimolecular proportions. Besides the favorable effect on lithium distribution, the use of the tetrahydrocarbon ethylene diamine also appears to modify the structure of the lithiated products, possibly by insuring a more symmetrical distribution of the lithium atoms between the two cyclopentadienyl rings of the ferrocene. At any rate, lithiated ferrocenes produced with the diamine (instead of forming intractable polymeric products when silylated with halotrialkyl silanes as is the case with products produced without the diamine) react with halotrialkyl silanes to produce novel liquid and/or crystalline compounds of definite composition. One of these novel compounds is quite interesting, being a crystalline tetrasilylated ferrocene in which the silyl groups are distributed equally between the pentadienyl rings.

The lithiated products of the process of this invention are useful, inter alia, as intermediates in the production of other derivatives of ferrocene such as carboxylated ferrocenes, and also, when contacted with conjugated diolefins such as 1,3-butadiene, will polymerize the same to form rubbery products of excellent green strength and building tack. The novel trimethyl silylated derivatives may be used as modifiers in connection with the so-called Ziegler catalysts.

With the foregoing general discussion in mind, there are given herewith detailed examples of the practice of this invention. The mass spectrum data in the examples were obtained on an MS9 Electronics Industries, Ltd. High Resolution Spectrometer, and the nuclear magnetic resonance data were obtained on a DA60I Varian Spectrometer.

EXAMPLES (A) Preparation of lithiated ferrocenes

Ferrocene—9.3 g. (0.05 mol)
Butyl lithium solution (14.98% by weight, in hexane)— 125 or 250 ml. (0.2 or 0.4 mol, per Table I)
N,N,N',N'-tetramethyl ethylene diamine—0, 23.2 or 46.4 ml. (0, 0.2 or 0.4 mol, per Table I)
Hexane—200 ml.

A series of runs was made in accordance with the above, schedule, using the ferrocene and tetramethyl ethylene diamine in the several runs in the amounts indicated in Table I. In each run the ferrocene and hexane were charged into a 1-liter bottle and sealed with a neoprene rubber-lined crown cap provided with a perforation for hypodermic addition of reactants. The butyl lithium and tetramethyl ethylene diamine were then injected hypodermically, and the bottle placed on a wheel which revolved and dipped it into a water bath at 70° C. for 96 hours. The bottle was cooled to 25° C. and opened in a glove box in an inert atmosphere, and the liquid decanted from the precipitated metalated ferrocene product. The product was washed several times by decantation with hexane. The mother liquor and washings were combined, and found by titration with acid to contain negligible alkalinity, indicating substantially complete reaction of the butyl lithium. The unreacted ferrocene was recovered by evaporation of the combined liquids, followed by sublimation. The percent of ferrocene so recovered is set forth for each run in Table I.

(B) Deuterium of lithiated ferrocenes

Lithiated product of Runs No. 1 or No. 3 (per Table I)—Entire product
Hexane—200 ml.
Deuterium oxide—10 ml. (5 increments of 2.0 ml.).

The products of Runs Nos. 1 and 3 were deuterated in accordance with the above recipe. In each case, the entire lithiated product was suspended in the hexane, cooled to −20° C., and treated with 5 increments of the deuterium oxide. Deuterium gas evolved rapidly during this manipulation. The hexane was evaporated from the reaction mass, and the deuterated ferrocenes recovered from the residue by sublimation. The yield of deuterated ferrocenes is set forth in Table I.

In order to determine the proportions of the ferrocenes in the products containing 1, 2, 3, etc., deuterium atoms (and inferentially the proportions of the ferrocenes originally containing 1, 2, 3, etc., lithium atoms), a sample of the deuterated product was subjected to mass spectroscopy. The results are set forth in Table I.

(C) Silylation of lithiated ferrocenes

Lithiated product of Runs No. 4 or No. 5 (per Table I)—Entire product
Chlorotrimethyl silane—135 ml.

Previous experiments had shown that the treatment of the lithiated products prepared in the absence of the tetramethyl ethylene diamine as in Runs Nos. 1 and 2 resulted in intractable polymeric products. Accordingly trimethyl silylation was only attempted in the case of products of Runs Nos. 4 and 5. In each of these cases the lithiated product, together with the chlorotrimethyl silane of the recipe, were charged into a bottle at −20° C. and the bottle was then purged with nitrogen, capped, heated to 50° C. and kept at this temperature for 12 hours. The resultant product was extracted with ether and the ether extract evaporated, leaving a residue of a red oil from which red crystals were deposited. The entire crude product of the ether extraction was subjected to mass spectroscopy to determine the proportions thereof containing 1, 2, 3, etc., trimethyl silicon groups (and inferentially the proportions of the original lithiated products containing 1, 2, 3, etc., lithium atoms), the results being set forth in Table I.

The red crystals in the residue which were isolated from the ether extract were separately subjected to mass spectroscopy, from which it was determined that this compound contained 4 trimethyl silicon groups and inferentially was derived from a tetra-lithiated product. Likewise this crystalline material was examined by nuclear magnetic resonance. The NMR spectrum showed a ratio of methyl hydrogen to ring hydrogen of 6:1 which is consonant with a tetra-substituted product. Likewise the NMR spectrum showed two sets of doublets whose area was in the ratio of 2:1; the structure most consistent with this splitting pattern is a symmetrical product with two trimethyl silyl groups on each ring.

tetraalkyl ethylene diamine in which the alkyl groups each contain from one to ten carbon atoms, the ratio of

TABLE I

| Reactants used (mols) | | | Unreacted ferrocene recovered (percent) | Yield of deuterated ferrocene (percent) | Mass spectroscopic distribution of products (percent) | | | | | | | | | | | | | | Run No. |
|---|---|---|---|---|---|---|---|---|---|---|---|---|---|---|---|---|---|---|---|
| Ferrocene | Butyl lithium | Tetramethyl ethylene diamine | | | Deuterated ferrocene (D atoms per molecule of ferrocene) | | | | | | | Silylated ferrocene (Si atoms per molecule of ferrocene) | | | | | | | |
| | | | | | 1 | 2 | 3 | 4 | 5 | 6 | 7 | 1 | 2 | 3 | 4 | 5 | 6 | 7 | |
| 0.05 | 0.2 | 0.0 | 34.4 | 55.0 | 16.5 | 24.8 | 13.7 | 15.0 | 10.0 | 8.9 | 3.6 | | | | | | | | 1 |
| 0.05 | 0.4 | 0.0 | 32.3 | 56.0 | | | | | | | | | | | | | | | 2 |
| 0.05 | 0.2 | 0.2 | | 88.0 | 4.2 | 25.6 | 28.3 | 30.8 | 7.4 | 1.5 | 0.3 | | | | | | | | 3 |
| 0.05 | 0.2 | 0.2 | | | | | | | | | | Tr. | 12.3 | 40.2 | 42.0 | 5.5 | Tr. | 0 | 4 |
| 0.05 | 0.4 | 0.4 | | (*) | | | | | | | | 0.5 | 1.9 | 10.7 | 48.0 | 28.5 | 10.2 | 10.2 | 5 |

* A repeat run gave 24 grams of total product.

From the foregoing general discussion and detailed specific experimental examples, it will be evident that this invention provides a novel method for the lithiation of ferrocene to products containing much higher proportions of higher lithiated products than have heretofore been possible. Likewise the higher lithiated products appear to have, in the case where the tetramethyl ethylene diamine is employed, some structures not present in products produced in the absence of the amines, since treatment with the silylating agent results in non-polymeric, clear-cut products, such as the tetrasilylated ferrocene.

What is claimed is:

1. Process of lithiating ferrocene or hydrocarbon-substituted ferrocene wherein a hydrocarbon lithium containing up to 40 carbon atoms is reacted with ferrocene or a hydrocarbon-substituted ferrocene containing up to three hydrocarbon groups replacing hydrogens on the rings, each hydrocarbon group containing up to 10 carbon atoms, said reaction being conducted in a hydrocarbon medium at temperatures in the range of 60° to 100° C., and being carried out in admixture with an N,N,N',N'-tetraalkyl ethylene diamine in which the alkyl groups each contain from one to ten carbon atoms, the ratio of N,N,N',N'-tetraalkyl ethylene diamine:hydrocarbon lithium being from 1:3 to 10:1.

2. Process according to claim 1, wherein the N,N,N',N'-tetraalkyl ethylene diamine is N,N,N',N'-tetramethyl ethylene diamine.

References Cited

UNITED STATES PATENTS 2,831,880  4/1958  Benkeser _____ 260—439
2,835,686  5/1968  Graham _____ 260—429
3,350,434  10/1967  Pellegrini et al. ____ 260—429.7

OTHER REFERENCES

Benkeser et al.: J. Am. Chem. Soc. (76), 1954, pp. 4025–6.

TOBIAS E. LEVOW, Primary Examiner

A. P. DEMERS, Assistant Examiner

U.S. Cl. X.R.

260—665

PO-1050
(5/69)

UNITED STATES PATENT OFFICE
CERTIFICATE OF CORRECTION

Patent No. 3,509,188   Dated  April 28, 1970

Inventor(s)  Adel F. Halasa and David P. Tate

It is certified that error appears in the above-identified patent and that said Letters Patent are hereby corrected as shown below:

Col. 2, line 35, "be" should read --been--

Col. 3, line 75, omit the comma (,), first occurrence

Col. 6, Run 5, under "7" (in the table)

"10.2" should read --0.2--

Signed and sealed this 16th day of May 1972.

(SEAL)
Attest:

EDWARD M.FLETCHER, JR.
Attesting Officer

ROBERT GOTTSCHALK
Commissioner of Patents